May 6, 1941.  D. W. McLENEGAN  2,241,070
HEAT PUMP SYSTEM
Filed July 15, 1939  2 Sheets-Sheet 1
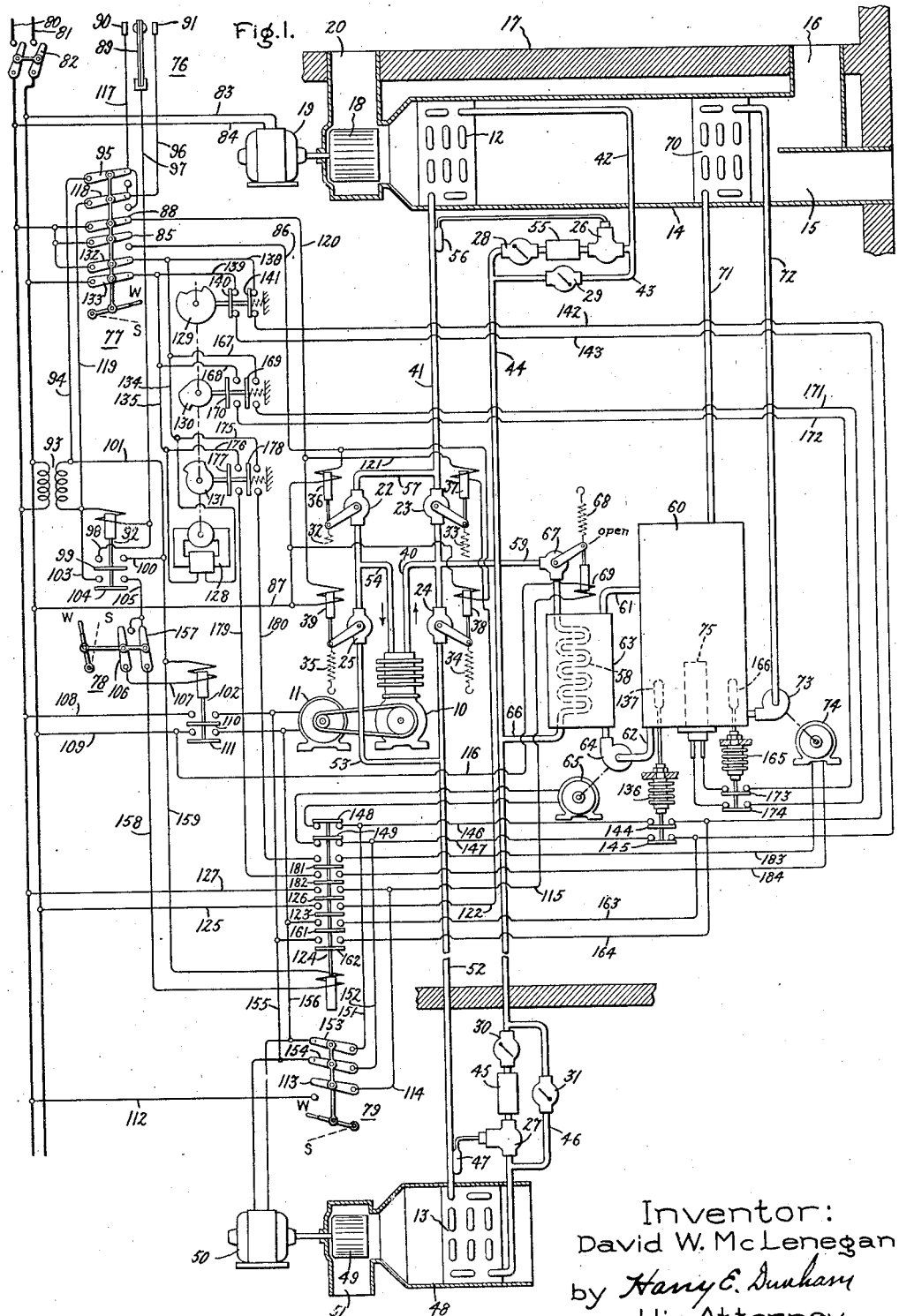
Inventor:
David W. McLenegan,
by Harry E. Dunham
His Attorney.

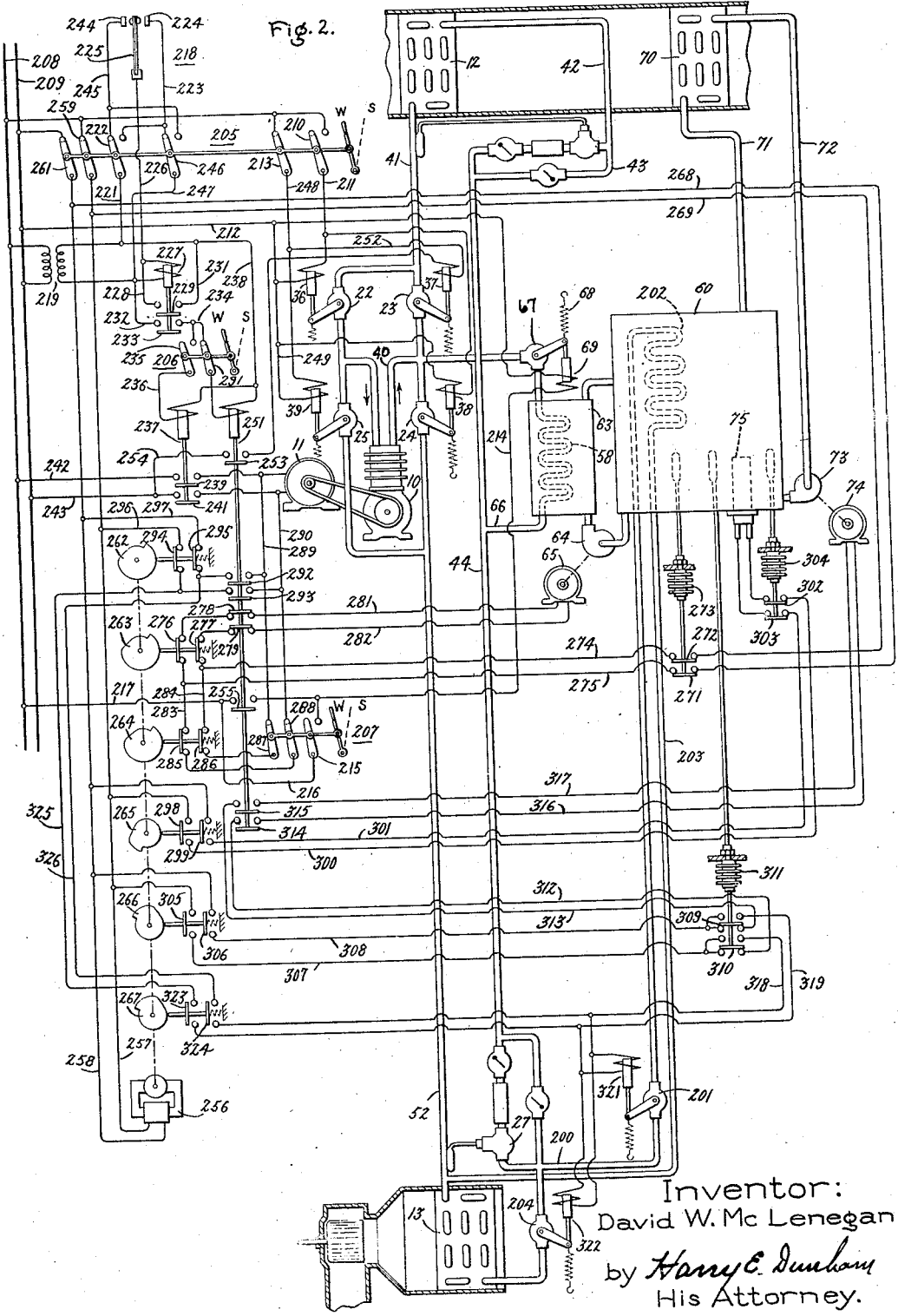

Patented May 6, 1941

2,241,070

UNITED STATES PATENT OFFICE 2,241,070

HEAT PUMP SYSTEM

David W. McLenegan, Caldwell, N. J., assignor to General Electric Company, a corporation of New York Application July 15, 1939, Serial No. 284,742

19 Claims. (Cl. 237—2)

My invention relates to systems for conditioning the air within rooms or enclosures, and particularly to such systems which utilize reversible refrigerating machines to supply both heating and cooling mediums.

Heat pumps or reversed cycle refrigerating machines may be employed to heat the air within the rooms of dwelling houses or other buildings. A heat pump commonly comprises a compression refrigerating machine including two heat exchangers, a compressor, and an expansion valve. One of the heat exchangers is arranged to provide heat for the air in the enclosure, and the other heat exchanger is arranged outside the enclosure to absorb heat. In some installations the refrigerating machine is made reversible and each of the exchangers may be operated either as a condenser or as an evaporator, depending upon whether the building is to be heated, as during winter operation, or cooled, as during summer operation. The outside heat exchanger may be arranged so that it absorbs heat from or gives up heat to a body of water such as deep well water which is of fairly constant temperature throughout the year. However, it is sometimes desirable to arrange the outside heat exchanger in an air duct and to pass outside air thereover. It is well known that the efficiency and capacity of a reversed cycle heat pump drops off when supplying heat to an enclosure, if heat must be absorbed at low temperatures, from outdoor air at zero degrees Fahrenheit or lower. The power requirements of the apparatus, therefore, during the winter season are generally materially greater than during the summer months when the apparatus is operating on a cooling cycle. For making the load of such a heat pump installation, which may be driven by electric power supplied from a utility network, a more attractive proposition to the utility companies, it is desirable that the power requirements of the apparatus during the period of peak residential load, as during the late afternoon and evening, be as light as possible. To accomplish this objective, the apparatus may be operated during off peak periods to store a quantity of heat in excess of the immediate demand which stored heat may be drawn upon to satisfy the heating requirements during the period of peak load. A system having such power consumption characteristics would justify the utility companies assessing a materially lower rate for the power consumed by the apparatus. Accordingly, it is an object of my invention to provide a fluid heating apparatus embodying a reversed cycle refrigerating machine and having an improved arrangement for the accumulation and storage of heat during off peak periods of power load which stored heat is then utilized for heating the enclosure during the period of peak load on the utility power system.

Another object of my invention is to provide a new and improved system for heating the air for an enclosure, which system includes a refrigerating machine and an additional electric heating means which system is automatically controlled during certain predetermined periods to both heat the enclosure and accumulate heat in a suitable storage reservoir for use during a second predetermined period when both the refrigerating machine and the electric heating means are deenergized.

Another object is to provide fluid heating apparatus including a reversed cycle system extracting heat from outdoor air, which apparatus will operate during limited periods of very low outdoor temperature with less reduction of both capacity and efficiency than would be the case if heat were transmitted directly from outdoor air to enclosure by the reversed cycle refrigerating machine alone.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 shows diagrammatically a system embodying one form of my invention and employed to heat the air within an enclosure; while Fig. 2 shows in a diagrammatic form a second modification of my invention.

Referring now to the drawings, in Fig. 1, I have shown an air conditioning system utilizing a reversible refrigerating machine or heat pump for cooling the air within an enclosure during the summer and for heating the air in the winter. The refrigerating machine comprises a compressor 10 driven by a motor 11 and connected in a refrigerant circuit including an indoor heat exchanger 12 and an outdoor heat exchanger 13. The heat exchanger 12 is arranged within a duct 14 provided with a fresh air inlet 15 and a recirculated air inlet 16 communicating with the enclosure to be conditioned and passing through a wall 17 of the enclosure. Air is circulated through the duct 14 by operation of a fan 18 driven by a motor 19 and is discharged into the enclosure through a duct 20 passing through the wall 17. Electrically operated valves 22, 23, 24 and 25 are provided for selecting the direction of flow of refrigerant through the refrigerant circuit of the heat pump. The heat exchangers 12 and 13 are provided with thermostatic expansion valves 26 and 27 respectively which control the admission of refrigerant to the exchangers when they operate as evaporators. The valve 26 is operable to control the admission of refrigerant to the heat exchanger 12 when that heat exchanger is being employed as an evaporator, check valves 28 and 29 being provided to prevent flow of refrigerant through the expansion valve 26 when the heat exchanger 12 is being employed as a condenser. Check valves 30 and 31 are provided to cooperate with the thermostatic expansion valve 27 and automatically control the flow of refrigerant so that the valve 27 is effective only when the heat exchanger 13 is being utilized as an evaporator. The electrically operated valves 22, 23, 24 and 25 are biased to their closed positions by springs 32, 33, 34 and 35 respectively and are provided with solenoids 36, 37, 38 and 39 respectively for opening the valves in opposition to the springs. When it is desired to operate the heat exchanger 12 as a condenser to heat the air passing through the duct 14 the valves 23 and 25 are held open by operation of the solenoids 37 and 39, and when it is desired to operate the heat exchanger 12 as an evaporator or cooling element to cool the air passing through the duct 14 the valves 22 and 24 are held open by operation of the solenoids 36 and 38. Only one pair of valves may be held open at a time.

During the operation of the heat pump to heat the air passing through the duct 14, refrigerant is compressed by the compressor 10, discharged through a connection 40, passes through the valve 23 and a conduit 41 into the heat exchanger 12 where it is cooled by the air passing through the duct 14 and is liquefied. The liquid refrigerant flows through connections 42 and 43, the check valve 29 and a conduit 44 and thence through the check valve 30 and into a liquid receiver 45, the check valve 31 being held closed to prevent the passage of liquid refrigerant into the heat exchanger 13 through a connection 46. The liquid refrigerant is admitted to the exchanger 13 by operation of the expansion valve 27 having a thermostatic control bulb 47 secured to the evaporator 13 near the outlet thereof. The heat exchange element 13 is arranged within a duct 48 and air from outside the enclosure to be conditioned and preferably outdoor air is circulated over the heat exchanger 13 by operation of a fan 49 driven by a motor 50, it being discharged through a duct 51 outside the enclosure to be conditioned. The refrigerant within the exchanger 13 is vaporized by the absorption of heat from the air passing through the duct 48 and the vaporized refrigerant is returned to the compressor 10 through a conduit 52, a connection 53, the valve 25 and a suction connection 54 of the compressor.

During the operation of the heat pump to cool the air passing through the duct 14 the valves 22 and 24 are open and refrigerant compressed within the compressor 10 is discharged through connection 40 and valve 24 into the conduit 52 and thence flows into the heat exchanger 13 serving as a condenser. The compressed refrigerant within the exchanger 13 is cooled and liquefied by the air passing through the duct 48. The liquid refrigerant is discharged through connection 46 and check valve 31 into conduit 44 from which it flows through check valve 28 into a liquid receiver 55, the check valve 29 being closed to prevent the passage of refrigerant through the connection 43 and into the heat exchanger 12. Liquid refrigerant from the receiver 55 is admitted to heat exchanger 12 by operation of the thermostatic expansion valve 26, the valve being provided with a thermostatic control bulb 56 secured to the exchanger 12 near the discharge end thereof. The liquid refrigerant within the heat exchanger 12 absorbs heat from the air passing through the duct 14 and thereby cools the air, the refrigerant being vaporized and discharged from the heat exchanger through connection 41 from which it is returned to the compressor 10 through a connection 57, the valve 22 and suction connection 54.

When the system is conditioned for heating the air passing through duct 14, means are provided for storing heat within a reservoir during off peak periods of power system load or periods of mild outdoor temperature when excess machine capacity is available which stored heat is transferred to the air in the duct 14 upon demand during the full peak load periods. The heat storage system includes a reservoir 60 for containing any suitable heat storage and transfer medium, such as water, which is connected by conduits 61 and 62 with another condenser or heat transfer unit 63. A circulating pump 64 adapted to be driven by a suitable electric motor 65 is arranged in the pipe 62. A refrigerant coil 58 arranged within the unit 63 is connected at one end by a conduit 59 with the outlet connection 40 of the compressor 10, the other end of the coil 58 being connected by conduit 66 with conduit 44. Arranged in the conduit 59 is a valve 67 biased to the open position by spring 68 and adapted to be operated to the closed position by solenoid 69. A heat exchanger 70 arranged within the duct 14 is connected to reservoir 60 by the conduits 71 and 72, the circulation of liquid between the reservoir 60 and exchanger 70 being controlled by the pump 73 provided in the conduit 72. Pump 73 is driven by a suitable electric motor 74 which, in turn, is energized through the control system upon demand for heat during a predetermined period of peak power load or a period of maximum heating requirements. An electric heating unit 75 is also arranged within the heat storage reservoir 60 which is selectively energized during certain off peak periods in conjunction with the operation of the compressor.

The system is automatically controlled by a thermostat 76 suitably arranged within the enclosure to be conditioned for either cooling or heating depending upon the position of the manually operated switches 77, 78, and 79. Power is supplied to the apparatus through the supply lines 80 and 81. Upon closure of switch 82 the fan motor 19 is energized through leads 83 and 84 and power is connected to the remainder of the control apparatus. For cooling the enclosure, as during summer operation, the switches 77, 78, and 79 are actuated to the S position energizing the solenoids 36 and 38, the energizing circuit extending from the supply line 80 through the arm 85 of switch 77, line 86, the solenoids 36 and 38, line 87 to the supply line 81. Due to the fact that the arm 88 of switch 77 is in the open circuit position, the solenoids 37 and 39 are de-energized and the corresponding valves 25 and 23 are held in their closed positions by their biasing springs. The control thermostat 76 comprises a bimetallic member 89 and fixed contacts 90 and 91. Upon a demand for cooling, that is, upon a predetermined rise in the enclosure temperature, the thermostatic member 89 will bend to the right thereby completing an energizing circuit for the control relay 92 from the transformer 93, the primary winding of which is connected across the supply lines 80 and 81. The energizing circuit for the relay 92 extends from one side of the secondary winding of the transformer 93 through the conductor 94, arm 95 of the switch 77, line 96, contact 91, thermostatic element 89, line 97, through the winding of the relay 92 to the other side of the secondary winding of the transformer 93. Upon the pick-up of relay 92, a holding circuit is completed therefor through the connection 98, arm 99 of the relay 92, connections 100 and 101. An energizing circuit is also completed for the relay 102 extending from one side of the transformer secondary winding through the connection 103, the arm 104 of relay 92 through connection 105, the arm 106 of the switch 78, line 107, relay 102, line 101 to the other side of the secondary of the transformer 93. Upon the pick up of relay 102, the motor 11 for driving the compressor 10 is connected directly across the supply lines 80 and 81 through the leads 108 and 109, and the arms 110 and 111, respectively, of relay 102. The compressor is thereupon driven by the motor 11 to pump heat from duct 14 to outdoors during the continuance of the high temperature condition within the enclosure during which time the thermostatic element 89 is in contact with the fixed contact 91. During cooling operation of the system, the heat storage portion thereof is inactive and valve 67 is held in the closed position. It will be noted that as switch 79 was moved to the S position, an energizing circuit was closed for the solenoid 69 extending from supply line 80, through line 112, arm 113 of switch 79, lines 114, 115, solenoid 69, lines 116, 109 to the other supply line 81. Upon the restoration of normal temperature conditions within the enclosure, the thermostatic element 89 will bend toward the left leaving the contact 91 and making contact with the fixed contact 90, thereby short circuiting the solenoid of the relay 92 through line 97, thermostatic element 89, contact 90, line 117, arm 118 of switch 77, line 119 to the other side of the solenoid of relay 92. Relay 92 will thereupon drop out deenergizing the relay 102 and disconnecting the motor 11 from the supply line.

To condition the system for winter operation, that is, for heating, the manual switches 77, 78, and 79 are moved to the W position as shown in the drawings. The arm 85 of switch 77 being thereby moved to the open circuit position, the solenoids 36 and 38 are deenergized whereupon the corresponding valves 22 and 24 are moved to the closed position by their biasing springs 32 and 34, respectively. Simultaneously an energizing circuit is completed for moving the valve 25 to the opened position. The energizing circuit for the operating solenoid extends from the supply line 80 through the arm 88 of the switch 77, through the line 120, solenoid 39, line 87 to the other supply line 81. The solenoid 37 is placed under the control of the thermostat 76, its energizing circuit extending from the supply line 80 through the arm 88 of switch 77, line 120, connection 121, solenoid 37, line 122, arm 123 of relay 124, line 125 to the other supply line 80. Throughout the various heating cycles of operation of the system to be more fully described, valve 67 is actuated simultaneously with valve 23 except in opposite directions, that is, since valve 67 is normally in the opened position, upon the energization of its actuating solenoid it is moved to the closed position, whereas the normally closed valve 23 upon energization of its solenoid is moved to the opened position. The energizing circuit for the solenoid 69 of valve 67 extends from the supply line 81 through lines 109, 116, solenoid 69, line 115 through the arm 126 of the relay 124, line 127 to the other supply line 80.

With the positioning of the switch 77 for winter or heating operation, a suitable timing motor 128 is energized for simultaneously driving the cam switches 129, 130, and 131 at a rate of one revolution per twenty-four hour period. These switches selectively control the operation of the apparatus with regard to the various periods of the day during which peak, off peak, and intermediate conditions of power load prevail. The cam of switch 129 may be so shaped that its contacts are open during the hours of peak residential load, for example, from four p.m. to nine p.m. The cam switch 130 closes its contacts during off peak periods, for example, from midnight to six a.m., while the cam switch 131 closes its contacts only during the hours of four p.m. to nine p.m. The timing motor 128 is energized from the supply lines 80 and 81, through arms 132 and 133 of switch 77 and lines 134 and 135. In the condition of the switches as shown when the thermostat 76 is not calling for heat and except during the hours of four to nine p.m., the compressor motor 11 and the pump 64 are operated to pump heat from outdoors into the heat storage reservoir 60.

Since a compressor does not ordinarily operate with high efficiency at high discharge temperatures, a temperature responsive device 136 having a bulb 137 arranged within the reservoir 60 is provided for deenergizing the motors 11 and 65 at reservoir temperatures above 125 deg. F. The energizing circuit for these motors during this period of operation extends from the supply lines 80 and 81, arms 132, 133 of switch 77, lines 138, 139, arms 140 and 141 of the switch 129, lines 142 and 143, the arms 144 and 145 of the water temperature responsive device 136, the lines 146 and 147, the arms 148 and 149 of the relay 124 to the motor 65, connected for driving pump 64. A circuit is also closed from lines 146 and 147 through the lines 151 and 152 through the arms 153 and 154 of switch 79, lines 155 and 156, to the compressor motor 11. During this condition of the system the valves 22, 23, and 24 are closed while valves 25 and 67 are in the opened position. Refrigerant then compressed within the compressor 10 is circulated through the conduits 40, 59, through the coil 58 within the heat transfer unit 63 where it is liquefied and the heat thereof transferred to the storage liquid. From unit 63, the refrigerant passes to the outdoor evaporator 13 and subsequently returns through the pipes 52, 53, and 54 back into the compressor.

Upon a call for heating by the enclosure thermostat during this period, the flow of refrigerant from the compressor is transferred from the heat exchanger 63 to the heat exchanger 12 in duct 14. The circulating pump motor 65 is deenergized at such time. Upon a predetermined drop in the enclosure temperature, the element 89 of the thermostat bends to the left engaging with the contact 90, thereby completing an energizing circuit for the relay 92. This energizing circuit extends from the upper terminal of the transformer secondary winding through the conductor 94, the arm 95 of switch 77, contact 90, thermostatic element 89, conductor 97, energizing winding of the relay 92 to the other terminal of the transformer secondary winding. When relay 92 picks up, a circuit is completed extending from the transformer secondary winding through connection 103, the arm 104 of relay 92, line 105, arm 157 of the switch 78, line 158, the coil of the relay 124, lines 159 and 101 to the other terminal of the transformer secondary winding. As the relay 124 picks up, the arms 148 and 149 open the circuit of the pump motor 65. A secondary energizing circuit will be completed for the compressor motor by-passing the contacts of the water temperature responsive device 136. By the closure of arms 161 and 162 of the relay 124, a by-pass circuit is completed through the lines 163 and 164 from lines 142 and 143 to lines 155 and 156. Simultaneously, the valve 23 will be opened by the closure of the arm 123 of the relay 124, and valve 67 will be closed upon the energization of its solenoid 69 through the arm 126 of relay 124. The system will then operate to circulate refrigerant from the compressor through the conduit 40, valve 23, conduit 41, condenser 12, conduit 42, by-pass 43, conduit 44 to the outdoor evaporator 13 and through the return conduits 52, 53, valve 25, and conduit 54 to the compressor. Upon the satisfaction of the demand for heat, the thermostat element 89 will make contact with the fixed contact 91 thereby deenergizing the relay 92 and relay 124 to recondition the system for pumping heat into the storage reservoir 60 as outlined above.

During off peak or low residential load periods, such as from midnight to six a. m., the temperature of the liquid within the storage reservoir 60 is increased to some predetermined higher value such as 200 degrees F. by the energization of the electric heater 75. The energizing circuit for this heater is controlled primarily by the cam switch 130 and secondarily by the water temperature responsive device 165 connected to the bulb 166 arranged within reservoir 60. The energizing circuit extends from the supply lines 80 and 81 through the arms 132 and 133 of the switch 77, lines 134, 135, lines 167, 168, arms 169, 170 of the cam switch 130, lines 171, 172, the arms 173, 174 of the water temperature responsive device 165 to the heater 75. If the temperature of the reservoir liquid has not been previously heated up to 125 deg. F. by the operation of the compressor alone, the heater 75 will assist the compressor until such temperature is reached. At 125 deg. F., the device 136 will open its contacts, deenergizing the compressor and pump motor 65, leaving the heater 75 to bring the temperature of the reservoir liquid up to the second limit by itself. Upon a call for heat by the enclosure thermostat 76 during this period, the compressor will circulate refrigerant through the condenser 12 and evaporator 13 to pump heat into the building from outdoors, in the manner previously described, while the electric heater will continue to supply heat to the storage reservoir.

During the hours of peak load, typically from four to nine p. m., the cam switch 129 will open its arms 140 and 141 to preclude the energization of the pump motor 65 and the compressor motor 11. During this period the demand for heat by the enclosure is satisfied solely from the reservoir. Simultaneously with the opening of cam switch 129, the cam switch 131 closes its contacts so that upon a call for heat by the thermostat 76, the pump motor 74 will be energized to circulate liquid from the reservoir through the heat exchanger 70. The energizing circuit for the pump motor 74 extends from the supply lines 80 and 81 through the arms 132 and 133 of the switch 77, lines 134, 135, lines 175, 176, arms 177, 178 of the cam switch 131, lines 179, 180, arms 181, 182 of the relay 124, lines 183, 184 to the motor 74. It will be remembered from above that the relay 124 is energized through relay 92 upon a call for heating by the thermostat 76. Upon the satisfaction of the demand for heat, the relay 124 will be deenergized and consequently also the pump motor 74 to stop the circulation of liquid from the heat storage reservoir 60 through the heat exchanger 70.

In the operation of the system as described above for the period of four to nine p. m., it is obvious that heat will be taken from the liquid in the storage reservoir 60 only as long as the temperature thereof is materially above the temperature of the circulated air. There remains, however, a large amount of heat stored within the liquid of the reservoir which, according to the second modification of the invention, may be utilized thus materially improving the efficiency of the system. It is understood that during such seasonal conditions as would necessitate a full utilization of the heating facilities, the outdoor evaporator may be operating at temperatures below freezing or even below zero F. The efficiency of the system will accordingly be relatively low. According to this modification of the invention, after the temperature of the liquid in the reservoir has been reduced to the neighborhood of 100 deg. F., (below which temperature only very slow heat transfer to room air is possible through coil 70) and the enclosure demands additional heating, the compressor is again brought into service. During this period the refrigerant, after being condensed in the heat exchanger arranged within the air circulating duct 14, is expanded and circulated within a coil arranged within the heat storage reservoir until the temperature of the liquid therein is reduced to substantially freezing or approaches the level of the outdoor temperature. Thus, the balance of the heat remaining in the storage liquid is pumped by the compressor into the enclosure.

The major portion of the piping system of the modification shown in Fig. 2 is substantially similar to the system shown in Fig. 1, and corresponding parts are identified by like reference characters. The chief distinction of the instant modification resides in the arrangement of a second evaporator within the liquid storage reservoir. A connection is made between the expansion valve 27 and the evaporator 13 by pipe 200 having an electrically controlled valve 201 arranged therein which pipe is connected to the second evaporator coil 202 provided within the heat storage reservoir 60. From the coil 202 the refrigerant flows through the pipe 203 to the pipe 52 at the outlet of the evaporator 13. An electrically operated valve 204 is arranged within the connection between the expansion valve 27 and the outdoor evaporator 13, which is controlled alternately with the valve 201 as will be described. By the arrangement shown, the expansion valve 27 is adapted to regulate the expansion of refrigerant in either of the evaporator units, though obviously individual expansion valves may be employed.

For conditioning the system for cooling, the manually operated switches 205, 206, and 207 are moved to the S position whereupon the valves 22 and 24 are actuated to the open position, and valves 23, 25, and 67 are closed. The energizing circuit for the solenoids 36 and 38 extends from the supply line 208 through the arm 210 of switch 205, the connection 211 through the energizing windings of the solenoids 36 and 38 connected in parallel through the connection 212 to the other suply line 209. In this position of the switch 205, the arm 213 is in the open circuit position whereby the solenoids of the valves 23 and 25 are deenergized and hence these valves are closed by their respective springs. Valve 67 is held closed by the energization of its solenoid 69, the energizing circuit extending from supply line 209 through line 212, solenoid 69, line 214, arm 215 of switch 207, lines 216, 217 to the other supply line 208. Upon a call for cooling, that is, upon a predetermined rise in temperature within the enclosure, the thermostat 218 will complete an energizing circuit for the compressor motor 11 and maintain it in operation until the temperature within the enclosure has decreased to its proper predetermined value. Upon such an increase in temperature a circuit will be completed extending from the secondary winding of the transformer 219, line 221, arm 222 of the switch 205, line 223 to the fixed contact 224, the thermostat arm 225, connection 226, through the winding of the relay 227 to the other terminal of the transformer secondary winding. As the relay 227 picks up, a holding circuit therefor will be created through the line 228, the arm 229 of the relay, line 231 to the other transformer terminal. A circuit is also closed by the relay 227 from one terminal of the transformer through the connection 232, the arm 233 of the relay 227, the connection 234, the arm 235 of the switch 206, the connection 236, winding of the relay 237, line 238 to the other secondary terminal of the transformer. As relay 237 picks up, the arms 239 and 241 connect the motor 11 through the lines 242 and 243 to the source of supply 208, 209. This circuit will be maintained until the temperature within the enclosure is reduced to such a value that the thermostat arm 225 makes contact with the fixed contact 244, thereby short circuiting the energizing coil of the relay 227 causing it to drop out. This circuit extends from one side of the coil through the line 226, the thermostat element 225, fixed contact 244, line 245, the arm 246 of the switch 205, line 247 to the other terminal of the coil of relay 227. As relay 227 drops out, relay 237 will be deenergized thereby opening the energizing circuit of the compressor driving motor 11.

For conditioning the system for heating as, for winter operation, the manual switches 205, 206, and 207 are moved to the W position as shown. The solenoids 36 and 38 are thereby deenergized since the arm 210 of the switch 205 is moved to the open circuit position, allowing valves 22 and 24 to be closed by their respective springs. Valve 25 is moved to the open position, the energizing circuit for its solenoid 39 extending from the supply line 208, through the arm 213 of the switch 205, the line 248, the winding of the solenoid 39, through connection 249, line 212 to the supply line 209. Valves 24 and 67, which are now normally deenergized, are adapted to be adjusted simultaneously and in opposite directions by the operation of the relay 251 which, in turn, is controlled by the operation of the thermostat 218. The timing motor 256 is connected to the supply lines through the lines 257, 258 and arms 259 and 261 of the switch 205. The timing motor 256 is suitably coupled for driving the cam switches 262 to 267, inclusive, the cams thereof being mounted upon a common shaft and so geared to the motor that they make one revolution per 24-hour period. They are so adjusted that switches 262, 263, and 264 are normally closed except during the period of peak residential load, for example, from four p. m. to nine p. m., the switch 265 being normally open and closed during the period of low load, for example, from midnight to six a. m., while switches 266 and 267 are normally open and closed during the period of four p. m. to nine p. m.

During the normal heating operation of the system with the exception of the period from four to nine p. m., and the low load period, the cam switches are substantially in the position as shown in which the cam switches 262, 263, and 264 are in the closed position while the cam switches 265, 266, and 267 are in the open circuit position. During this period and when the thermostat is not calling for heat, the compressor 10 is operated to pump heat into the liquid within the storage reservoir 60 from outdoors. During this time valves 22, 23, 24, and 201 are closed, while valves 25, 67, and 204 are opened. The circulating pump 64 is driven by the motor 65 energized from the supply lines through the arms 259 and 261 of the switch 205, lines 268, 269, arms 271, 272 of the storage liquid temperature responsive device 273, lines 274, 275, arms 276, 277 of the cam switch 263, arms 278, 279 of the relay 251, lines 281, 282 to the motor 65. The energizing circuit for the compressor motor 11 at this time extends from the above mentioned lines 274, 275, connections 283 and 284, the arms 285 and 286 of the cam switch 264, the arms 287, 288 of the switch 207, lines 289 and 290 to the motor 11. As long as the thermostat 218 does not call for enclosure heating during this period, the compressor and the circulating pump 64 are operated continuously until the temperature of the liquid within the storage reservoir 60 has reached such a value as regards the discharge temperature of the compressor above which the compressor does not operate with reasonable efficiency, for example, 125 degrees F. Above this temperature the temperature responsive device 273 holds open the arms 271, 272 deenergizing both the pump motor 65 and the compressor motor 11.

Upon a call for heat by the thermostat 218 during this period, either while the compressor is pumping heat into reservoir 60 or is at standstill, the pump motor 65 is deenergized and the control of the compressor motor 11 is taken over by the thermostat. At the same time, the valve 67 is closed and the valve 23 is opened, so that heat is pumped from the outdoor evaporator to the duct condenser 12. Upon such a call for heat, the thermostat element 225 will bend to the left making contact with the fixed contact 244, thereby completing the energizing circuit for the relay 227 through lines 221, 245, and 226, which relay will close an energizing circuit for relay 251 extending from one terminal of the secondary winding of the transformer 219 through the line 232, the arm 233 of the relay 227, line 234, the arm 291 of the switch 206, through the energizing winding of the relay 251, line 238 to the other terminal of the secondary winding of transformer 219. As the relay 251 picks up, an energizing circuit is closed for the solenoid 37 of valve 23 which circuit extends from the supply line 208 through the arm 213 of switch 205, lines 248, 252, the solenoid 37, arm 253 of the relay 251, line 254 to the other supply line 209. At the same time valve 67 will be energized thereby moving it to the closed position, the energizing circuit for the solenoid 69 extending from the supply line 209 through conductor 212, solenoid 69, line 214, the arm 255 of the relay 251, the line 217 to the other supply line 208. Since arms 278 and 279 of relay 251 are moved to the open circuit position upon the energization of relay 251, the previously described energizing circuits for pump motor 65 and motor 11 are broken. Now the compressor motor 11 will be energized by a circuit established through the arms 292 and 293 of the relay 251, arms 294 and 295 of the cam switch 262, lines 296, 297, the lines 257 and 258, through the arms 259 and 261 of the switch 205 to the supply lines 208 and 209. As long as the thermostat 218 is in this condition, the compressor will continue to operate until the demand for heat is satisfied. Upon the thermostat bending toward the right engaging with contact 224, the winding of relay 227 will be short circuited thereby de-energizing the relay 251 and disconnecting the compressor motor 11 from the line. At the same time the valve 67 will be reopened, valve 23 reclosed, and the compressor motor 11 and the pump motor 65 will be conditioned to continue with the storage of heat in the reservoir 60 under the control of the liquid temperature responsive device 273 as outlined above.

During the off peak period of the day, such as between the hours of midnight and six a. m., the electric heater 75 in the storage reservoir is connected across the line to cooperate with the compressor in heating the liquid within the reservoir. The timer motor 256 will have rotated the cam switch to such a position that switch 265 is closed. The energizing circuit for the electric heater 75 may be traced from the supply lines 208 and 209 through the arms 259 and 261 of the switch 205, the lines 257, 258, the arms 298 and 299 of the cam switch 265, the lines 300 and 301, the arms 302 and 303 of the temperature responsive device 304, and to the heater 75. As soon as the temperature of the liquid within the storage reservoir 60 has reached the level of 125 degrees, the storage liquid temperature responsive device 273 will open its contacts 271, 272, deenergizing the compressor motor 11 and the circulating pump motor 65. The electric heater 75, however, will continue to heat the water within the reservoir under the control of the temperature responsive device 304 which will open the heater circuit upon the temperature of the liquid reaching a predetermined level, for example, of 200 degrees F.

Upon a call for heating during this period by the thermostat 218, such heat will be supplied to the building by the operation of the compressor 11 as previously described, while the electric heater 75 will continue to supply heat to the liquid within the storage reservoir 60.

During the period of peak residential load from four to nine p. m., the demand for heat by the enclosure is supplied first from the liquid within the reservoir until the temperature thereof is reduced to a predetermined value, when the compressor will be again thrown into operation. At this time the timer motor 256 will have rotated the cam switches so that switches 266 and 267 are closed, while the switches 262, 263, 264, and 265 are open. During this period upon a call for heat by the thermostat 218, the relay 227 will pick up, energizing the relay 251 thereby completing an energizing circuit for the pump motor 74. The energizing circuit for this motor extends from the supply lines 208, 209 through the arms 259, 261 of switch 205, lines 257, 258, arms 306 and 305 of the cam switch 266, lines 307, 308, arms 309, 310 of the storage liquid temperature responsive device 311, lines 312, 313, arms 314, 315 of the relay 251, lines 316, 317, to the circulating pump driving pump driving motor 74. Liquid will thereupon be circulated from the heat storage reservoir 60 through the heat exchanger 70 by the pump 73 until the demand for heat by thermostat 218 has been satisfied or until the temperature of the liquid within the storage reservoir 60 has been reduced to a level of approximately 125 degrees, when the temperature responsive device 311 will move its contact arms to the uppermost position. When this latter condition has occurred, the pump motor 74 will be deenergized and the compressor will be operated to pump the heat remaining in the storage reservoir into the condenser 12. It will be noted that as the temperature responsive device 311 is actuated to its uppermost position, an energizing circuit is established for actuating the valves 201 and 204. This energizing circuit may be traced from the supply lines 208 and 209 through the arms 259 and 261 of the switch 205, lines 257, 258, the arms 305, 306 of the cam switch 266, lines 307, 308, arms 309 and 310 of the thermal responsive device 311, lines 318 and 319 to the solenoids 321 and 322 connected in parallel for operating the valves 201 and 204 respectively. The valve 201, which is normally closed, will be moved to the opened position while valve 204, which is normally open, will be actuated to the closed position. An energizing circuit is also established for the compressor motor extending from the above mentioned lines 318 and 319 through the arms 323 and 324 of switch 267, lines 325, 326, arms 292 and 293 of the relay 251, lines 289 and 290 to the motor 11. During this phase of operation of the system, the refrigerant circuit may be traced from the compressor 10 through the pipe 40, valve 23, pipe 41, condenser 12, pipes 42, 43, 44, expansion valve 27, pipe 200, evaporator coil 202, pipe 203 to the compressor return pipe 52.

From the foregoing, it is apparent that I have provided an air conditioning system utilizing a reversed cycle refrigerating machine or heat pump for heating the air within an enclosure and also for storing heat in a suitable reservoir during a predetermined off peak period or period of reduced heating requirement in conjunction with an additional electric heating unit, which stored heat is then utilized for heating the air within the enclosure during a second predetermined peak load period. This stored heat may be utilized down to a lower temperature level than that of the room to be heated, as a means of reducing the amount of liquid storage required.

While I have described my invention in connection with a refrigerating machine for conditioning the air within an enclosure, other uses will readily be apparent to those skilled in the art. I do not, therefore, desire my invention to be limited to the particular construction shown and described, and I intend in the appended claims to cover all modifications falling within the spirit and scope of my invention.

What I claim as new and desire to secure by Letters Patent of the United States is:

1. Apparatus for heating the fluid within an enclosure including a refrigerating machine for pumping heat from a region exterior of said enclosure, heat storage means, means for connecting the refrigerant circuit of said refrigerating machine for heating said fluid to a predetermined temperature, means operative during one predetermined period for connecting the refrigerant circuit of said machine for heating said heat storage means to a predetermined temperature when the refrigerant circuit of said machine is not connected for heating said fluid, and means for transferring heat from said heat storage means to said fluid during a second predetermined period.

2. A system for heating the air within an enclosure including a duct, a reversed cycle refrigerating machine having a compressor and an evaporator and a condenser, said compressor being arranged to supply compressed refrigerant to said condenser and to withdraw vaporized refrigerant from said evaporator, means for circulating the air through said duct and into said enclosure, means including said condenser for heating at least a portion of the air circulated through said duct, a reservoir containing a heat storage liquid, a heat exchanger in said duct, means for circulating said liquid through said heat exchanger, a heat transfer unit for heating said liquid by said compressor, and means for selectively connecting said compressor to said condenser or to said heat transfer unit.

3. A system for heating the air within an enclosure including a duct, a reversed cycle refrigerating machine having a compressor and an evaporator and a condenser, said compressor being arranged to supply compressed refrigerant to said condenser and to withdraw vaporized refrigerant from said evaporator, means for circulating air through said duct and into said enclosure, means including said condenser and a heat exchanger for heating air circulated through said duct, a reservoir containing a heat storage liquid connected to said heat exchanger, a second condenser arranged for heating liquid in said reservoir, means responsive to the temperature within said enclosure, and means responsive to the actuation of said temperature responsive means for selectively connecting said compressor either to said first or to said second condensers.

4. A system for heating the air within an enclosure including a duct, a reversed cycle refrigerating machine having a compressor and a condenser and an evaporator, said compressor being arranged to supply compressed refrigerant to said condenser and to withdraw vaporized refrigerant from said evaporator, means for circulating the air through said duct and into said enclosure, means including said condenser and a heat exchanger for heating the air circulated through said duct, a reservoir containing a heat storage liquid, a pump for circulating said liquid through said heat exchanger, a heat transfer unit adapted to be connected to said compressor for heating said heat storage liquid, means responsive to the temperature within said enclosure having two operative positions, means for conditioning said system for operation during a predetermined period whereby said compressor supplies refrigerant to said condenser upon said temperature responsive means moving to one operative position and supplies refrigerant to said heat transfer unit upon said temperature responsive device moving to its other operative position.

5. A system for heating the air within an enclosure including a duct, a reversed cycle refrigerating machine having a compressor and an evaporator and a first condenser, said compressor being arranged to supply compressed refrigerant to said first condenser and to withdraw vaporized refrigerant from said evaporator, means for circulating air through said duct and into said enclosure, said first condenser and a heat exchanger being arranged in said duct for heating the air circulated therethrough, a reservoir containing a heat storage liquid, a second condenser adapted to be connected to said compressor for heating the liquid in said reservoir, means responsive to the temperature within said enclosure for selectively connecting said compressor either to said first or said second condensers during a predetermined period, and means for circulating liquid from said reservoir through said heat exchanger during a second predetermined period upon the actuation of said enclosure temperature responsive means.

6. A system for heating the air within an enclosure including a duct, a reversed cycle refrigerating machine having a compressor and an evaporator and a condenser, said compressor being arranged to supply compressed refrigerant to said condenser and to withdraw vaporized refrigerant from said evaporator, means for circulating the air through said duct and into said enclosure, means including said condenser and a heat exchanger for heating the air circulated through said duct, a reservoir containing a heat storage liquid, means for circulating said liquid through said heat exchanger, means for heating said heat storage liquid during predetermined periods, means responsive to the temperature within said enclosure for effecting the energization of said compressor and said liquid circulating means, and timing means for selectively controlling the energization of said compressor and said liquid circulating means by said temperature responsive means during predetermined periods.

7. A system for heating the air within an enclosure including a duct, a machine having a refrigerant compressor, a condenser and an evaporator, means for circulating air through said duct and into said enclosure, means including said condenser and a heat exchanger for heating the air circulated through said duct, a reservoir containing a heat storage liquid connected to said heat exchanger, a second condenser arranged for heating the liquid in said reservoir, means responsive to the temperature within said enclosure, means responsive to the actuation of said temperature responsive means for selectively connecting said compressor for supplying refrigerant either to said first or to said second condensers, and means responsive to a predetermined temperature of the liquid in said reservoir for precluding the operation of said compressor to supply refrigerant to said second condenser.

8. A system for heating the air within an enclosure including a duct, a refrigerating machine having a compressor and a condenser and an evaporator, said condenser being arranged in said duct for heating the air circulated therethrough, a reservoir containing a heat storage liquid, a heat exchanger arranged in said duct and connected to said reservoir, means for circulating liquid from said reservoir through said heat exchanger, means for heating the liquid in said reservoir, means responsive to the temperature within said enclosure for effecting the energization of said compressor and said liquid circulating means, and timing means for controlling the energization of said heating means during a predetermined period and for controlling the energization of said liquid circulating means during another predetermined period.

9. A system for heating the air within an enclosure including a duct, a refrigerating machine having a compressor and a condenser and an evaporator, said condenser being arranged within said duct for heating the air circulated therethrough, a reservoir containing a heat storage liquid, a heat exchanger arranged in said duct and connected to said reservoir, means for circulating liquid from said reservoir through said heat exchanger, means for heating the liquid in said reservoir, means responsive to the temperature within said enclosure for effecting the energization of said compressor and said liquid circulating means, and timing means for controlling the energization of said compressor during one predetermined period and for controlling the energization of said liquid circulating means during another predetermined period.

10. A system for heating the air within an enclosure including a duct, a refrigerating machine having a compressor and a condenser and an evaporator, said condenser being arranged within said duct for heating the air circulated therethrough, a reservoir containing a heat storage liquid, a heat exchanger arranged within said duct and connected to said reservoir, means for circulating liquid from said reservoir through said heat exchanger, electric heating means for heating the liquid in said reservoir, means responsive to the temperature within said enclosure for effecting the energization of either said compressor or said liquid circulating means, timing means for limiting the energization of said electric heating means to a predetermined period of off peak residential load, said timing means precluding the energization of said compressor during a second predetermined period of peak residential load, and permitting the energization of said liquid circulating means by said temperature responsive means during said last mentioned predetermined period.

11. A system for heating the air within an enclosure including a duct, a reversed cycle refrigerating machine, a reservoir containing a heat storage liquid, a heat exchanger in said duct, means for circulating said liquid through said heat exchanger, a condenser connected to said machine for heating said liquid in said reservoir to a first predetermined temperature, additional heating means for heating said liquid from said first predetermined temperature to a second higher predetermined temperature, and timing means for energizing said additional heating means only during a predetermined period, and for energizing said liquid circulating means only during a second predetermined period.

12. A system for heating the air within an enclosure including a duct, a refrigerating machine having a compressor and a condenser and an evaporator, said condenser arranged in said duct for heating air circulated therethrough, a reservoir containing a heat storage liquid, a heat exchanger arranged in said duct connected to said reservoir, a pump for circulating liquid between said reservoir and said heat exchanger, a heat transfer unit including a second condenser adapted to be connected to said compressor for heating the liquid in said reservoir, an electric heating element for heating the liquid in said reservoir, a timer, a first switch controlled by said timer for permitting energization of said electric heater only during a predetermined period, a second switch controlled by said timer for permitting the energization of said compressor for supplying refrigerant to said second condenser only during a predetermined period, and a third switch controlled by said timer for permitting the energization of said liquid circulating pump only during a further predetermined period.

13. A system for heating the air within an enclosure including a duct, a refrigerating machine having a compressor and a condenser and an evaporator, said condenser being arranged within said duct, means for circulating air to be heated through said duct, a reservoir containing a heat storage liquid, a heat exchanger arranged in said duct and connected to said reservoir, a pump for circulating liquid between said reservoir and said heat exchanger, a second condenser adapted to be connected to said compressor for heating the liquid in said reservoir, means responsive to a predetermined temperature of the liquid in said reservoir for precluding the energization of said compressor for supplying refrigerant to said second condenser, heating means for heating the liquid in said storage reservoir, means responsive to a second higher predetermined temperature of the liquid in said storage reservoir for controlling said heating means, a motor driven timer, a first switch adjustable by said timer for permitting the energization of said reservoir liquid heating means only during a predetermined period, a second switch adjustable by said timer for permitting the energization of said compressor for supplying refrigerant either to said first or to said second condenser, and a third switch adjustable by said timer for permitting the energization of said liquid circulating pump during a second predetermined period.

14. A system for heating the air within an enclosure including a duct, a reversed cycle refrigerating machine including a compressor, a condenser arranged within said duct, an evaporator arranged externally of said duct, a reservoir containing a heat storage liquid, a second condenser unit and a second evaporator unit arranged in a heat exchanging relationship with the liquid in said reservoir, means for selectively connecting said compressor to supply refrigerant either to said first or to second condenser during one predetermined period, and means for connecting said second evaporator unit to said compressor during a second predetermined period.

15. A system for heating the air within an enclosure including a duct, a reversed cycle, refrigerating machine including a compressor, a condenser arranged in said duct, an evaporator arranged externally of said duct, a reservoir containing a heat storage liquid, means for heating the liquid in said reservoir during a predetermined period, a second evaporator unit arranged in a heat exchanging relationship with the liquid of said reservoir, and means for connecting said second evaporator unit to said compressor during a second predetermined period.

16. A system for heating the air within an enclosure including a duct, a reversed cycle refrigerating machine including a compressor, a condenser arranged in said duct, an evaporator arranged externally of said duct, a reservoir containing a heat storage liquid, a second condenser unit and a second evaporator unit arranged in a heat exchanging relationship with the liquid of said reservoir, means for selectively connecting said compressor to supply refrigerant either to said first or to said second condenser unit during one predetermined period, means responsive to a predetermined temperature of the liquid in said reservoir for precluding the connection of said compressor to supply refrigerant to said second condenser unit during said one predetermined period, and means for connecting said second evaporator unit to said compressor during a second predetermined period with said compressor connected to said first condenser.

17. A system for heating the air within an enclosure including a duct, a reversed cycle refrigerating machine including a compressor, a first condenser unit arranged in said duct, a first evaporator arranged externally of said duct, a reservoir containing a heat storage liquid, a second condenser unit and a second evaporator unit arranged in the heat exchanging relationship with the liquid of said reservoir, means responsive to the enclosure temperature, means controlled by said enclosure temperature responsive means for selectively connecting said compressor to supply refrigerant either to said first or to said second condenser unit during one predetermined period, means responsive to a first predetermined temperature of the liquid in said heat storage reservoir for precluding the operation of said compressor to supply refrigerant to said second condenser unit during said predetermined period, additional heating means for the liquid in said reservoir, means for controlling the energization of said additional heating means during said predetermined period to heat said liquid to a second predetermined higher temperature, means controlled by said enclosure temperature responsive means for transferring the heat from said storage liquid to said duct during a second predetermined period, including said second evaporator unit.

18. A system for heating the air within an enclosure including a duct, a refrigerating machine having a compressor and an evaporator and a condenser, said condenser being arranged in said duct, a reservoir containing a heat storage liquid, a heat exchanger arranged in said duct, means for circulating the liquid through said heat exchanger, means for heating the liquid within said reservoir to a predetermined temperature, means for limiting the energization of said heating means to a predetermined period, means responsive to the temperature within said enclosure, means for permitting the energization of said liquid circulating means by said temperature responsive means during a second predetermined period until the temperature of said liquid is reduced to a predetermined relatively low value, a second evaporator unit arranged in a heat exchanging relationship with said reservoir, means for permitting the energization of said compressor by said temperature responsive means including means for circulating the refrigerant from said condenser through said second evaporator unit after the temperature of the liquid in said reservoir has been reduced to said predetermined low value.

19. A system for heating the air within an enclosure including a duct, a refrigerating machine having a compressor and an evaporator and a condenser, said condenser being arranged in said duct, a reservoir containing a heat storage liquid, a heat exchanger arranged in said duct, means for circulating said liquid through said heat exchanger, a second condenser adapted to be connected to said compressor for heating the liquid within said reservoir to a first, predetermined temperature, additional means for heating the liquid within said reservoir to a second predetermined higher temperature, means for limiting the heating of the liquid in said reservoir to a predetermined period, means responsive to the temperature within said enclosure, means controlled by said enclosure temperature responsive means for energizing said liquid circulating means during a second predetermined period, means responsive to a predetermined relatively low temperature of the liquid within said reservoir for deenergizing said liquid circulating means during said second predetermined period.

DAVID W. McLENEGAN.